United States Patent [19]

Miyake et al.

[11] Patent Number: 5,754,872

[45] Date of Patent: May 19, 1998

[54] CHARACTER INFORMATION PROCESSING SYSTEM

[75] Inventors: Toshie Miyake, Owariasahi; Akio Suzuki, Nagoya, both of Japan

[73] Assignee: Hitachi, Ltd., Tokyo, Japan

[21] Appl. No.: 203,305

[22] Filed: Mar. 1, 1994

[30] Foreign Application Priority Data

Mar. 3, 1993 [JP] Japan .................. 05-042623

[51] Int. Cl.⁶ .................................................. G06F 17/28
[52] U.S. Cl. ................................. 395/758; 395/753
[58] Field of Search .................. 364/419.02, 419.03, 364/419.04; 395/753, 758, 754, 757, 760, 601, 606, 200.03, 203.05; 382/101

[56] References Cited

U.S. PATENT DOCUMENTS

| 5,175,684 | 12/1992 | Chong et al. ............... | 364/419.02 |
| 5,497,319 | 3/1996 | Chong et al. ............... | 364/419.02 |

FOREIGN PATENT DOCUMENTS

| 64-7279 | 11/1989 | Japan ............... | 395/759 |
| 2-53377 | 2/1990 | Japan ............... | 395/759 |
| 2-244257 | 9/1990 | Japan ............... | 395/759 |
| 228983 | 11/1990 | Japan ............... | 364/419.02 |
| 4188362 | 7/1992 | Japan ............... | 364/419.02 |

OTHER PUBLICATIONS

Everest, "Database Management", McGraw Hill, Inc. 1986 pp. 732-781.

Primary Examiner—Gail O. Hayes
Assistant Examiner—Frantzy Poinvil
Attorney, Agent, or Firm—Antonelli, Terry, Stout, & Kraus, LLP

[57] ABSTRACT

In a character recognizing system having a plurality of terminals interconnected by a network, a dictionary for recognizing a character pattern inputted in an image form is distributed to each terminal. When a dictionary necessary for recognizing a character pattern inputted from one terminal is not provided in that terminal, the character pattern is transferred through the network to another terminal in which the necessary dictionary is provided, and is recognized by the other terminal. Each terminal is provided with a function of specifying a terminal having a dictionary necessary for recognizing the inputted character pattern. For example, characters offering keys are defined beforehand and each terminal is provided with a dictionary capable of recognizing the key characters and a table indicative of a relationship between the key characters and terminals corresponding to the key characters, whereby one terminal is specified in accordance with a key character.

14 Claims, 15 Drawing Sheets

FIG. 7

| ADDRESS | | NAME OF BRANCH |
|---|---|---|
| HOKKAIDO | SAPPORO-SHI ✳✳-KU <br> ✳✳-KU <br> ⋮ ⋮ <br> ASHIBTSU-SHI ⋮ <br> ABASHIRI-SHI ⋮ <br> ⋮ ⋮ | BRANCH 1 |
| AICHI-KEN | ⋮ ⋮ <br> NAGOYA-SHI ATSUTA-KU <br> ⋮ <br> MEITO-KU <br> ⋮ | BRANCH 2 |
| | OWARIASAHI-SHI <br> HEKINAN-SHI <br> ⋮ <br> ⋮ | BRANCH 3 |
| KAGOSIMA-KEN <br><br><br> OKINAWA-KEN | ⋮ <br> KAGOSHIMA-SHI <br> AKUNE-SHI <br> ⋮ <br> NAHA-SHI <br> ISHIGAKI-SHI | BRANCH 4 |

FIG. 9

90 GERMAN

| CHARACTER | WORD |
|---|---|
| | der |
| | dessen |
| | dem |
| | den |
| | die |
| | deren |

93 FRENCH

| CHARACTER | WORD |
|---|---|
| | le |
| | la |
| | les |
| | il |
| | elle |
| | ils |
| | ellese |

92 ENGLISH

| CHARACTER | WORD |
|---|---|
| | THE |
| | The |
| | the |
| | is |
| | IS |
| | THAT |
| | That |
| | that |

91 JAPANESE

| CHARACTER | WORD |
|---|---|
| て | |
| も | |
| に | |
| は | |

CHARACTER INFORMATION PROCESSING SYSTEM

BACKGROUND OF THE INVENTION

The present invention relates to a character information processing system, and more particularly to a system which is suitable for processing character information inputted in an image form.

There is widely known a system for recognizing character information or character patterns read from an optical character reader (OCR). Such a system needs a dictionary for recognizing character patterns. For example, in the case of the Japanese language, a dictionary for recognizing the Japanese language involves a very large amount of information since several thousands of characters and several tens of thousands of phases (or Chinese compound words) composed of the combination thereof are used. Therefore, the system requires a large memory capacity and a high processing rate. A character recognition system used in a country or an area, in which a plurality of languages are used, also requires a large memory capacity and a high processing rate since a dictionary for each language is necessary.

In a general character recognition system, a large-sized computer is used because of its large memory capacity and in order to take advantage of the high-speed utilization of a dictionary stored therein. JP-A-(HEI)4-188362, JP-A-(HEI) 2-289083, JP-A(HEI)2-244257 and JP-A-(HEI)2-53377 all disclose a system including a host computer and a plurality of terminal computers, each of which is provided with a dictionary for character recognition. In the disclosed system, a general dictionary purpose or a dictionary for technical terms is distributed for each terminal computer, and the host computer processes characters which cannot be processed by each terminal computer. Access to the host computer is made upon failure of the processing by the terminal computers.

JP-A-(SHO)64-7279 disclose a system for recognizing a group of characters of a hierachical structure which include an upper-level character group (or bank names) and a lower-level character group (or branch names).

SUMMARY OF THE INVENTION

An object of the present invention is to provide a novel character recognition system. In the system according to the present invention, no host computer is required and dictionaries are respectively provided in terminals which are interconnected by a network. The respective terminals are provided with different dictionaries and access from one terminal to another terminal is allowed. As a result, the memory capacity requirements for each terminal is substantially reduced.

Each terminal performs a function of specifying the location of a dictionary used for character recognition, that is, a terminal including that dictionary. Thereby, fast access to a required dictionary is possible. In one embodiment, a predetermined relationship is defined between the location of a dictionary and character information which offers a key. The key information is picked up from inputted character information to determine the location of the dictionary on the basis of the predetermined relationship.

In a system in which the use of various languages is forseeable, a word characteristic of each language is used as the key information. In the case where hierarchically represented characters such as an address are to be recognized, a word representing an upper level or a wider area (for example, the name of a country, the name of a state or the name of a great town) is used as the key information.

Each terminal has an individual dictionary. It is preferable that the dictionary is rewritable.

In the case of a system for recognizing an address, a plurality of terminals are arranged at respective areas of the whole country, and each terminal stores, in its individual dictionary, detailed addresses which are in an area where that terminal is arranged.

In a system for recognizing a language, each terminal is provided with a dictionary for recognizing one language. With regard to a language such as English for which the frequency of subjection to recognition is high, it is preferable that each terminal is provided with an additional dictionary for recognizing such a language.

In the case where the recognition of a new language is required, a terminal having a dictionary corresponding to the new language is added to the network of a language recognition system of the present invention. Namely, the extension of the system is easy.

There is also disclosed an embodiment of the invention in which a translating function is added to a language recognition system. In this case, each terminal is provided with a dictionary for translating one predetermined language into another predetermined language and a processor. It is preferable that in each terminal, the one predetermined language or a language to be translated is made coincident with a language which becomes the object of recognition.

In another embodiment regarding a system for searching the meaning of technical terms, each of terminals interconnected by a network is provided with a general dictionary and a dedicated dictionary. The dedicated dictionaries are different for the respective terminals. In this search system, treatises, diagrams and other including terms which become the objects of search, are inputted in an image form. A predetermined term used characteristically for each field is used as key information.

BRIEF DESCRIPTION OF THE DRAWINGS

These and other objects and features and technical advantages of the present invention will be readily apparent from the following description of the preferred exemplary embodiments of the invention in conjunction with the accompanying drawings, in which

FIG. 7 shows the contents of a jurisdiction branch search table;

FIG. 9 shows the contents of a language kind specifying dictionary;

DESCRIPTION OF THE PREFERRED EMBODIMENTS

A system according to a first embodiment of the present invention will now be explained referring to FIGS. 1 to 7. The system of this embodiment is an address recognition system used in a banking organ which covers the whole of Japan.

Figure 2:
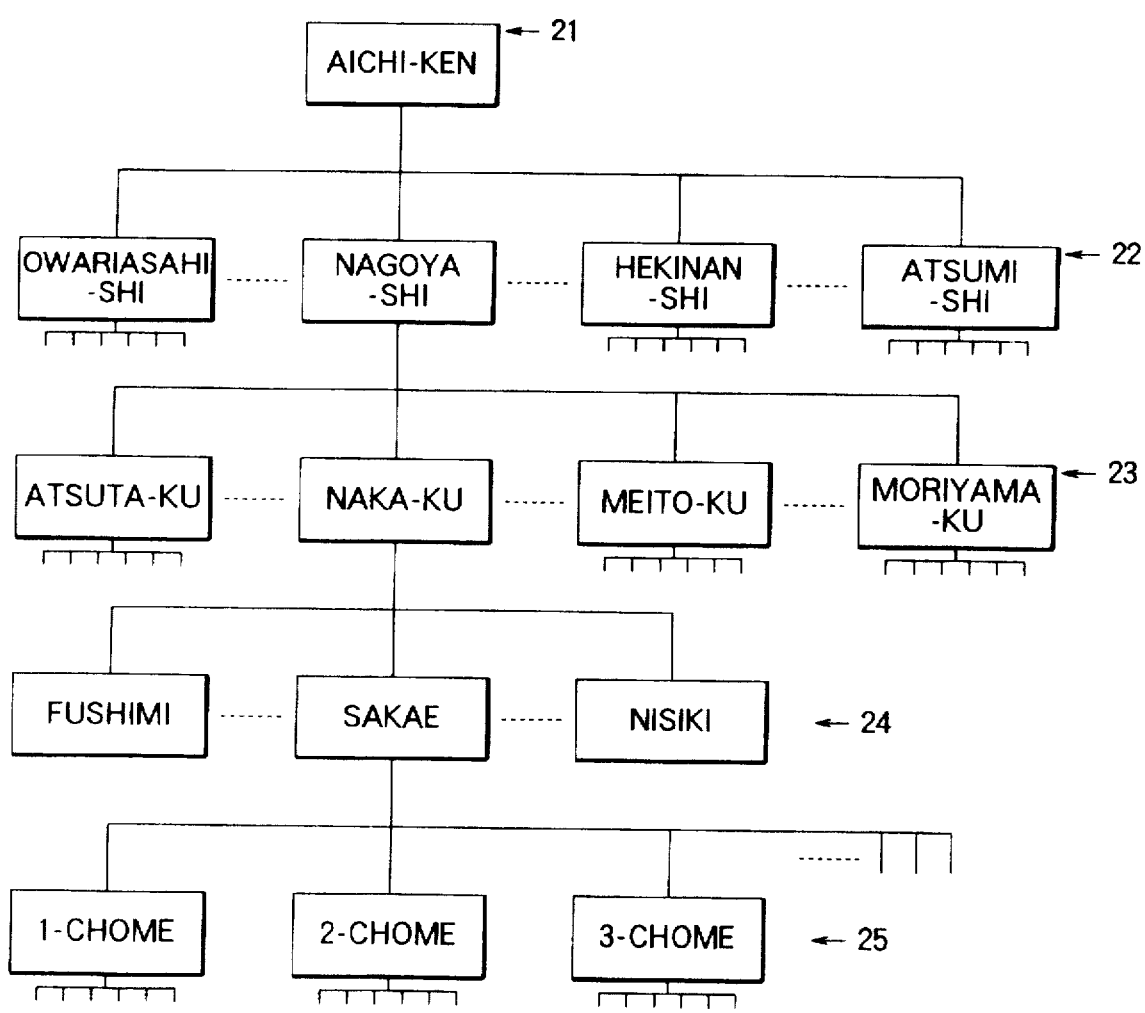
FIG. 2 is a diagram showing a hierarchical structure of the representation of an address in Japan.
Figure 3:
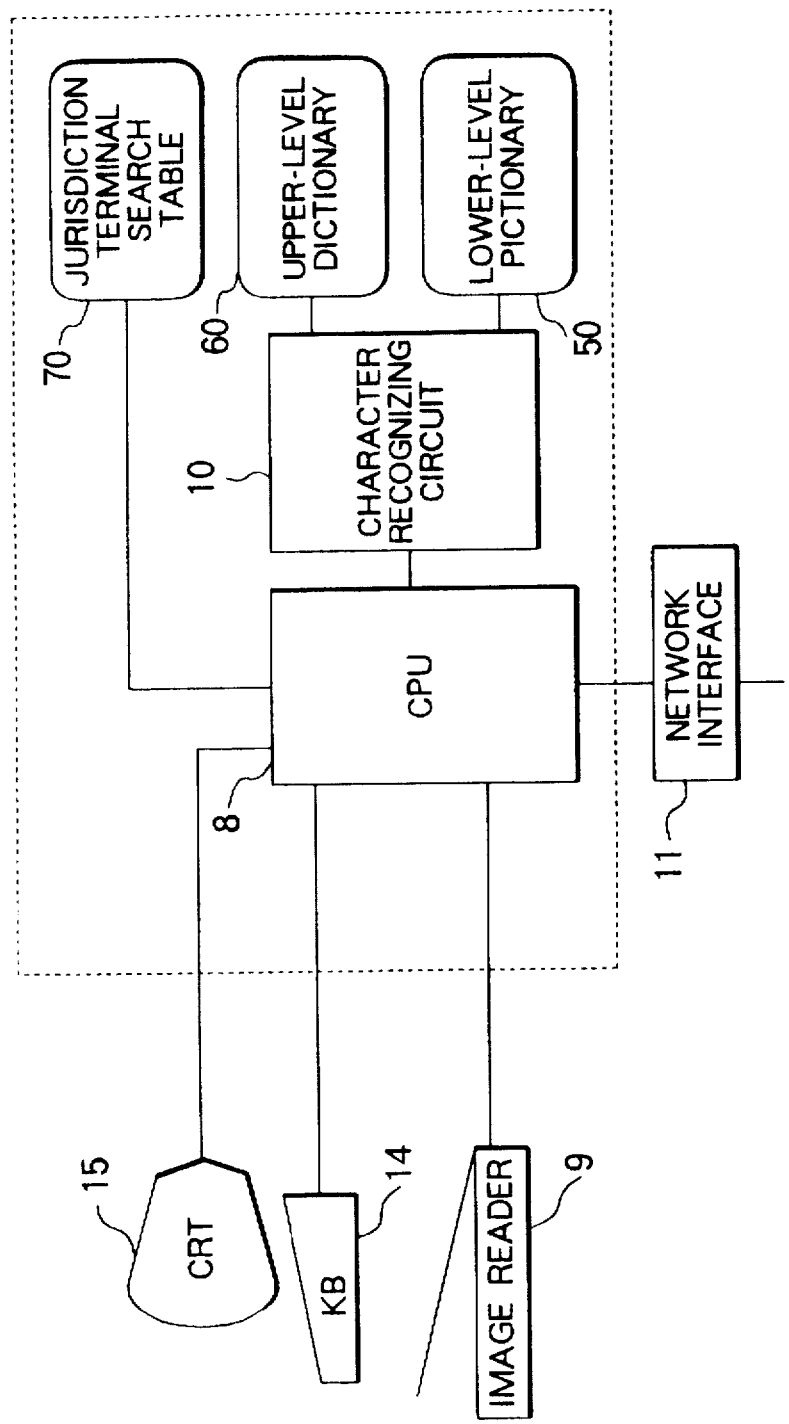
FIG. 3 is a diagram showing the construction of a terminal in the first embodiment.

First, a hierarchical structure of an address, which becomes the object of recognition in the present embodiment, will be explained by use of FIG. 2. In general, an address in Japan is provided with the name of To, Do, Fu or Ken (urban or rural prefecture) of a region of interest, the name of Shi (city) and/or Ku (ward) in that urban or rural prefecture, the name of cho (street) or Gun (district) in that city or ward, and the Cho (chome), Ban (lot) and Go numbers or the name of minor section or major section in that street or district which form a hierarchical structure with the name of urban or rural prefecture being taken as an upper level. For example, the address in the case of Aichi Prefecture has a hierarchical structure which includes "Aichi-Ken" as the uppermost level or first level 21, "Nagoya-Shi", "Owariasahi-Shi", "Atsumi-Gun" and so on as a second level 22 lower than the first level, "Naka-Ku" and so on in the case of Nagoya-Shi as a third level 23 lower than the second level, "Sakae" and so on as a fourth level 24 lower than the third level, "1-Chome" and so on as a fifth level 25 lower than the fourth level, and the Lot number or the name of minor section or major section lower than the fifth level, as shown in FIG. 2.

Figure 1:
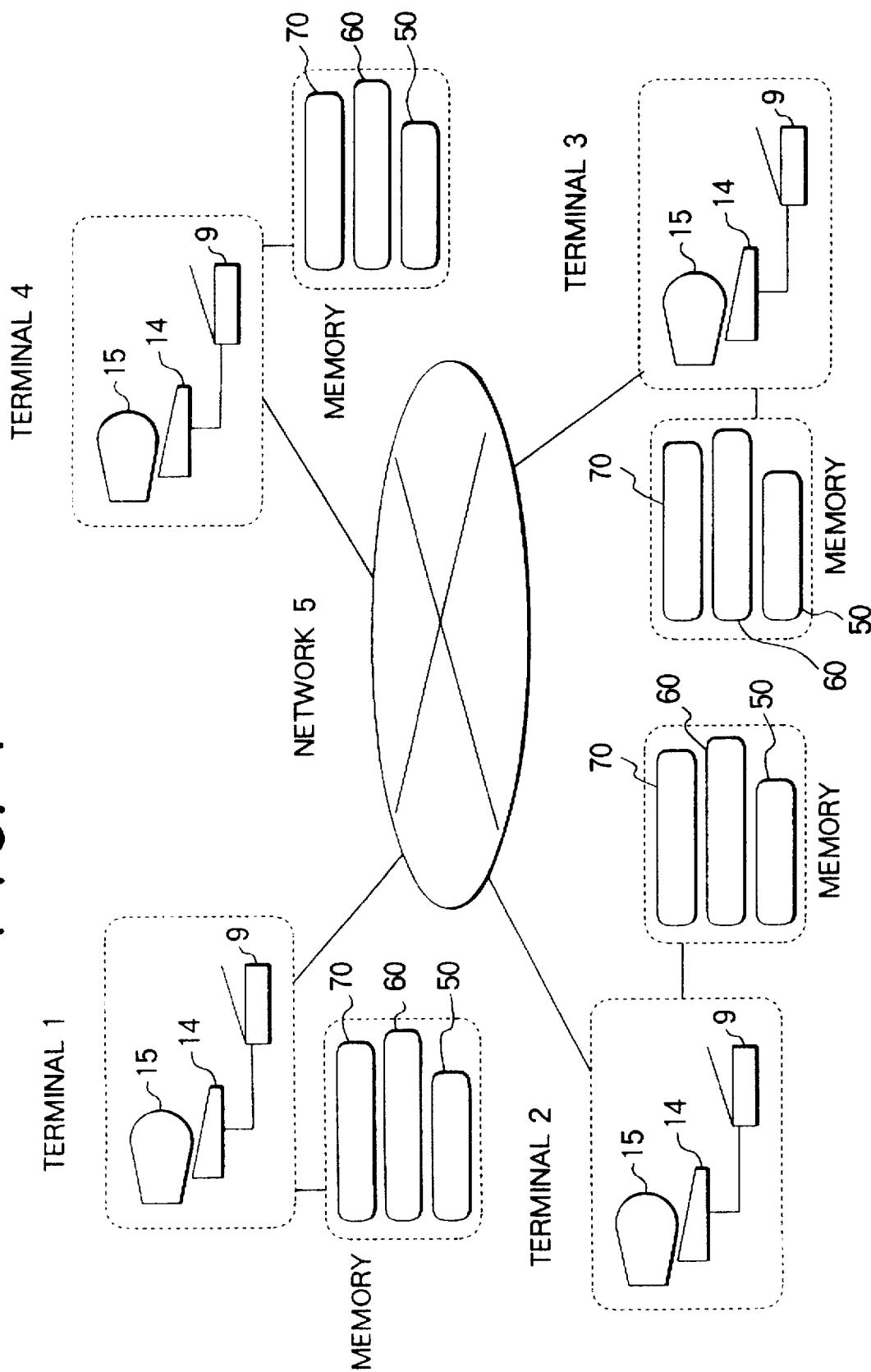
FIG. 1 is a diagram showing the overall construction of an address character recognition system according to a first embodiment of the present invention.

An address character recognition system or dictionary distributed system shown in FIG. 1 includes terminals 1 to 4 on-line connected by a network 5 using a telephone line. Each terminal is disposed at a branch which exercises jurisdiction over one or more areas in the second level of the above hierarchical structure. As shown in detail by FIG. 3, each of the terminals 1 to 4 includes an image reader or scanner 9 for optically reading a paper on which an address is written, a character recognizing circuit 10 for making a character recognition through conversion into character codes by picking up characters from image data read by the image reader 9 and converting them into character codes with reference made to dictionaries which will be mentioned later on, a lower-level dictionary 60 for recognizing characters representative of regions of the third level and levels lower than that in the area over which the corresponding branch exercises jurisdiction, an upper-level dictionary 50 for recognizing characters of the first and second levels, a jurisdiction branch search table 70 for making, from characters of the first and second levels read by the upper-level dictionary 50, a search for a branch which exercises jurisdiction over the corresponding address, a network interface 11 on-line connected to other branches through the network 5 for transferring image data, text data and so on, a display section 15 for displaying the result of character recognition and so on, a keyboard 14 for inputting an instruction of an operation for the correction of character recognition, the input of characters and so on by an operator, and a controller or CPU 8 for controlling the above components. The image reader 9 may serve as an ordinary facsimile equipment.

Figure 5:
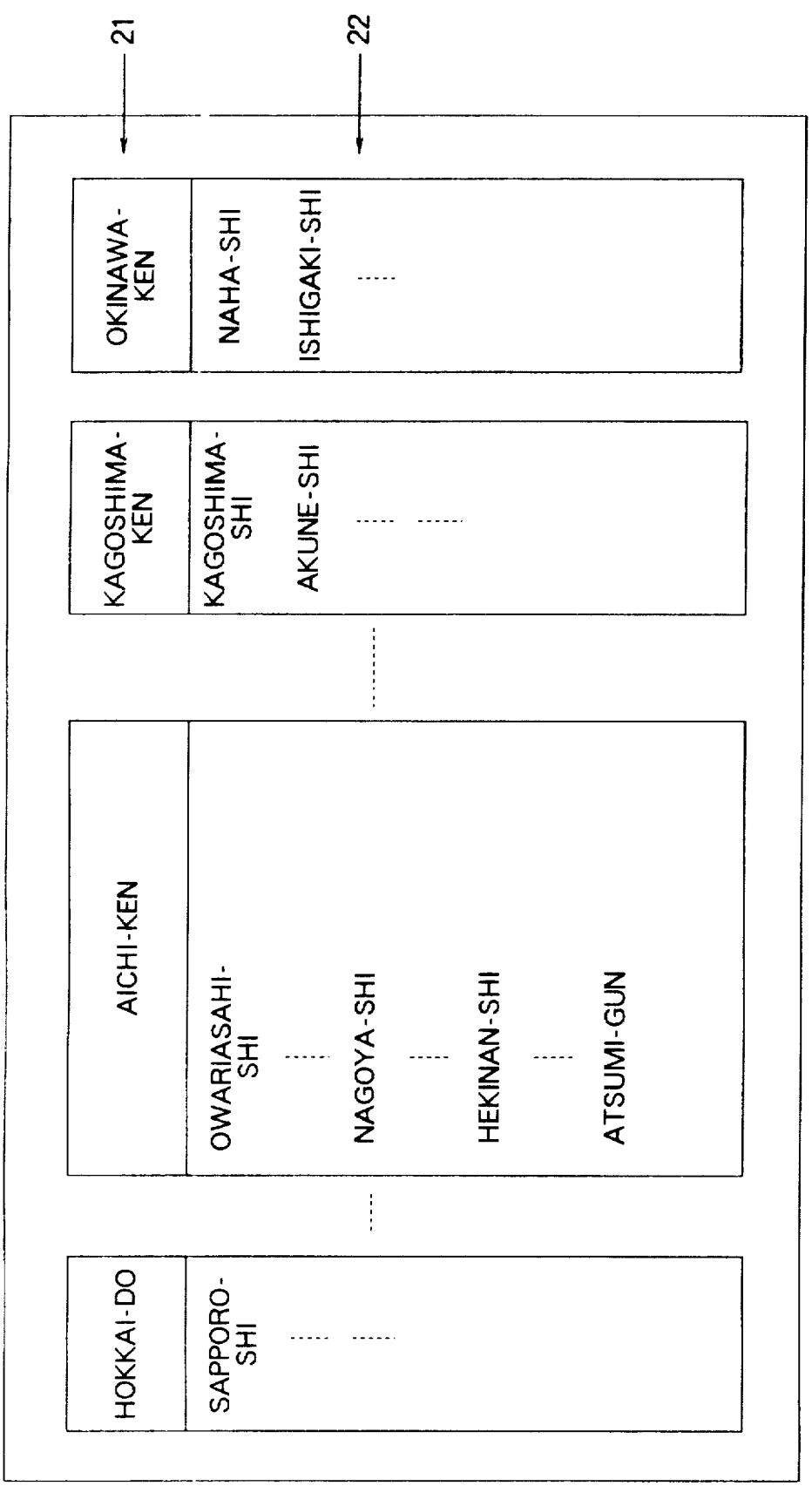
FIG. 5 shows the contents of an upper-level dictionary.

As shown in FIG. 5, the upper-level dictionary 50 stores character patterns of the first and second levels therein. As has already been mentioned, each branch covers one or more areas represented by the second level 22. Regarding a great town such as Nagoya city, there is the case where each ward is handled as the second level. In such a case, "Nagoya-Shi" is written in pair with each ward name (see FIG. 7). This is because an address in Nagoya city is represented in many cases in a form in which "Aichi-Ken" is omitted. The upper-level dictionary 50 is stored in each of the terminals 1 to 4.

Figure 6B:
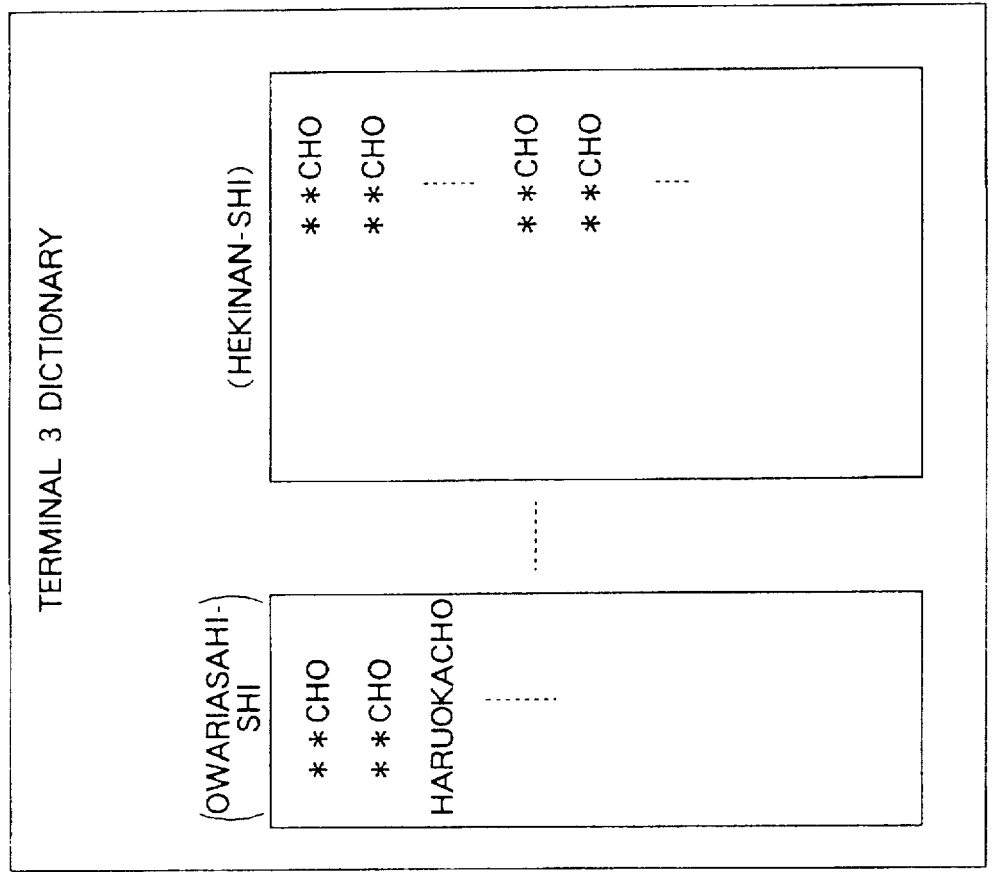
FIGS. 6A and 6B show the contents of lower-level dictionaries.
Figure 6A:
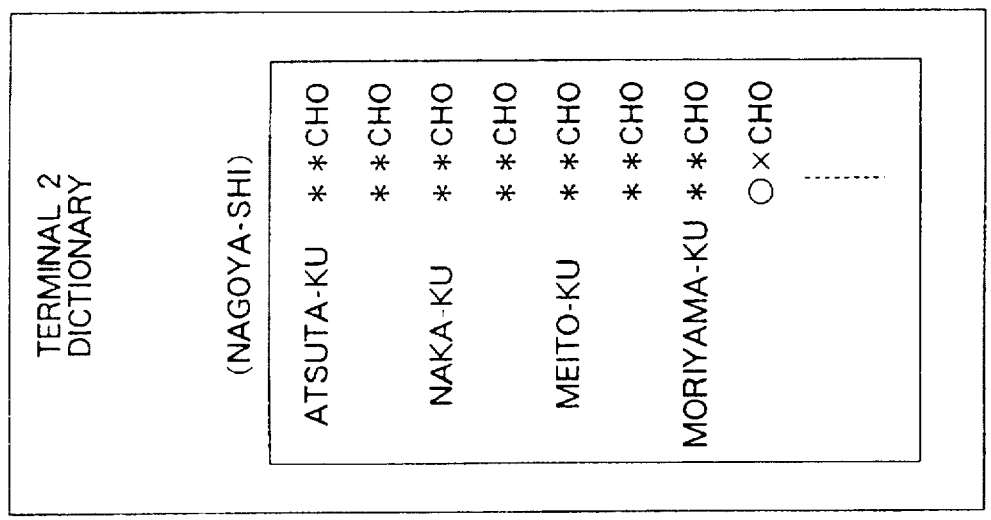

On the other hand, the lower-level dictionary 60 is different for each terminal and the contents thereof include character groups representing regions of the third level and levels lower than that. FIG. 6A shows the contents of the lower-level dictionary in the case where the terminal 2 exercises jurisdiction over the whole area of Nagoya city, and FIG. 6B shows the contents of the lower-level dictionary in the case where the terminal 3 exercises jurisdiction over the whole area of Aichi Prefecture excepting Nagoya city. In FIGS. 6A and 6B, only the third level or the third and fourth levels are represented for an illustrative restriction. In actual, character groups representing all regions of the third level and levels lower than that in accordance with the hierarchical structure shown in FIG. 2 are stored.

The jurisdiction branch search table 70 is a table for making, on the basis of the result of recognition of characters of the first and second levels by the character recognizing circuit 10 with reference made to the upper-level dictionary 50, a search for a branch which exercises jurisdiction over the corresponding area, as apparent from FIG. 7. For example, in the case where the result of recognition of characters of the second level is "Owariasahi-Shi", it is shown that the area is under the jurisdiction of the branch 3.

In the case where the result of recognition is "Nagoya-Shi", it is shown that the area is under the jurisdiction of the branch 2.

In the system having the above construction, those of address characters inputted from the image reader 9 of each branch, which are in an upper level of the hierarchical structure, are recognized referring to the upper-level dictionary 50. Using the recognized upper-level address in the hierarchical structure, a jurisdictional branch of the recognized upper-level address is determined by the jurisdiction branch search table 70. In the case where the jurisdictional branch (or terminal) is itself or the branch inputted with the address characters, the its own lower-level dictionary 60 is used to make an address recognition down to the lower level. In the case where the jurisdiction branch is another branch, an address character pattern of the lower level is transferred to the other corresponding branch through the network interface 11 to make a character recognition using the lower-level dictionary 60 of the other branch and the result of recognition is transferred back again from the other branch through the network 5.

Figure 4:
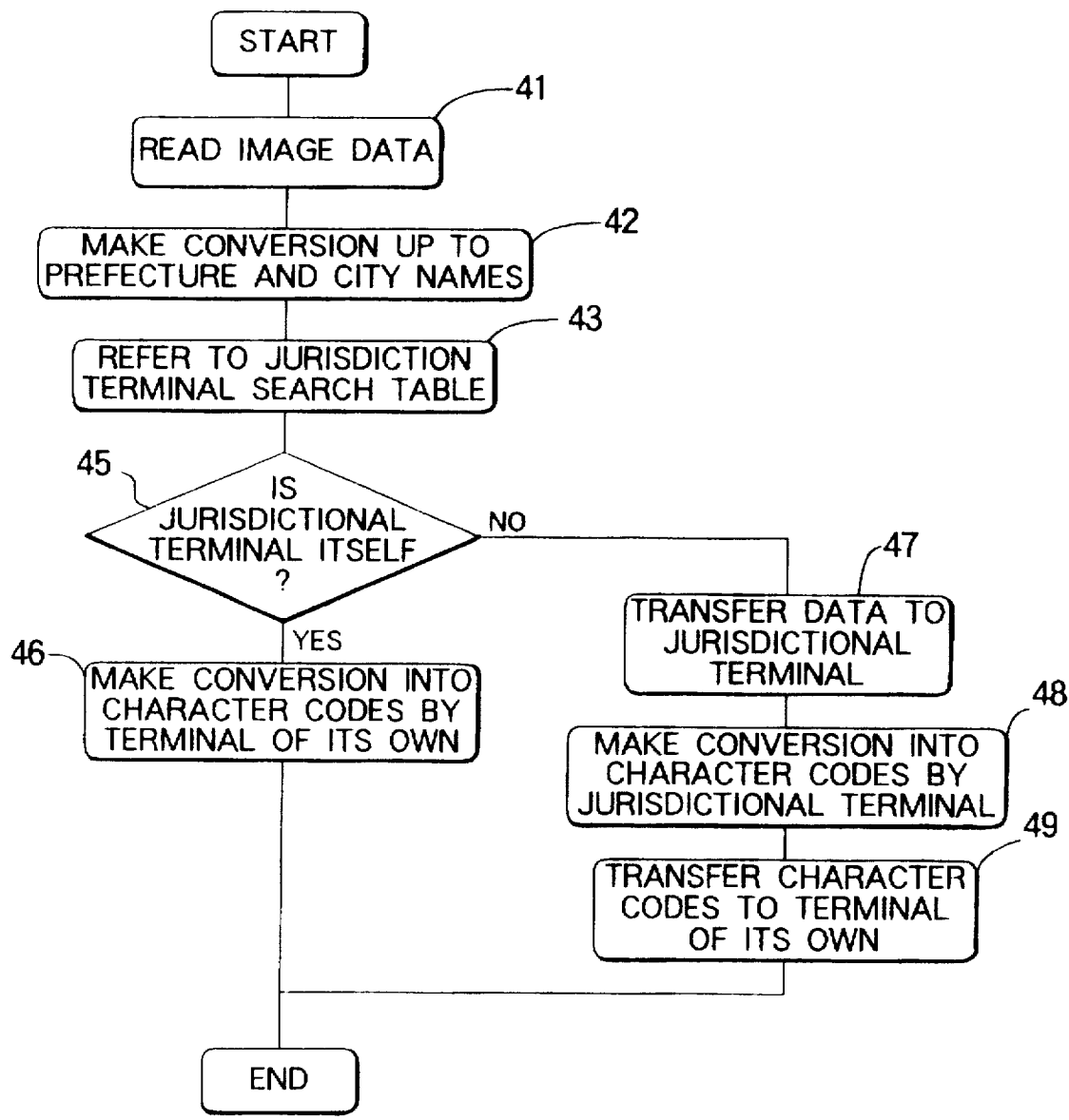
FIG. 4 is a flow chart of a processing performed in the first embodiment.

An example of address recognition will be explained by use of a processing flow shown in FIG. 4 in conjunction with the case where a customer of a branch having the terminal 2 disposed therein has removed to an address over which a branch having the terminal 3 disposed therein exercises jurisdiction and the customer has presented an address change notice to the branch having the terminal 3. Now assume that in a character entry frame of a document of the address change notice, "x○ cho, Atsuta-Ku, Nagoya-Shi, Aichi-Ken" has been written as an address before change and "xx banchi, Haruokacho, Owariasahi-Shi, Aichi-Ken" has been written as an address after change. First, the image reader 9 of the terminal 3 reads image data of the before-change address of the document "x○ cho, Atsuta-Ku, Nagoya-Shi, Aichi-Ken" (step 41), and the character recognizing circuit 10 makes conversion into character codes up to prefecture and city names with reference made to the upper-level dictionary 50 (step 42). The controller 8 searches the jurisdiction branch search table 70 by use of the result of recognition, that is, "Nagoya-Shi, Aichi-Ken" to determine that the upper-level address is under the jurisdiction of the terminal 2 (step 43), and transfers image data of a lower level address to the jurisdictional terminal 2 through the network interface 11 and the network 5 (step 47) after step 45. In this example, a part of image data is transferred. However, the whole of image data may be transferred.

The terminal 2 recognizes the received image data by the character recognizing circuit 10 by use of the lower-level dictionary 60 (step 48) and transfers character codes as the result of recognition to the terminal 2 through the network interface 11 and the network 5 (step 49). In this manner, the terminal 3 in the present embodiment can make the recognition of character patterns which are not included in the lower-level dictionary of its own. When the after-change address of the document of the address change notice, that is, "xx cho, Atsuta-Ku, Nagoya-Shi, Aichi-Ken" is thereafter read, the terminal 3 makes the recognition of upper-level characters and a search for a jurisdictional branch through steps 41 to 43, determines that the jurisdictional branch is itself (step 45), and recognizes a lower-level address character pattern by the character recognizing circuit 10 with reference made to the lower-level dictionary 60 of the terminal 3 itself (step 46), thereby completing the processing.

Thus, in the dictionary distributed system for address recognition according to the present embodiment, an address recognition is made by utilizing the fact that an address is a hierarchical structure, that is, by recognizing address characters of an upper level of the hierarchical structure, identifying a corresponding jurisdictional branch terminal by use of the upper-level address and with reference made to a jurisdiction branch table and transferring a lower-address character pattern to the corresponding branch terminal directly. Therefore, an address recognition down to the lower level can be performed at a high speed and effectively even in the case where a dictionary is distributed.

Though the above embodiment has been explained taking an address in Japan by way of example, the present invention is not limited to the address in Japan. For example, the present invention is also applicable to the recognition of hierarchically represented address characters such as country name, city name and so on with the country name being taken as the uppermost level. In this case, since the name of a country is included in an address written on an ordinary international mail matter, a country name dictionary of the uppermost level may be registered in the upper-level dictionary 50 while the lower-level dictionary 60 is further hierarchically structured into areas of that country. It is preferable that an address recognition in such a case is made by a system which includes a detailed address dictionary based on a hierarchical structure with at least three levels.

Figure 8:
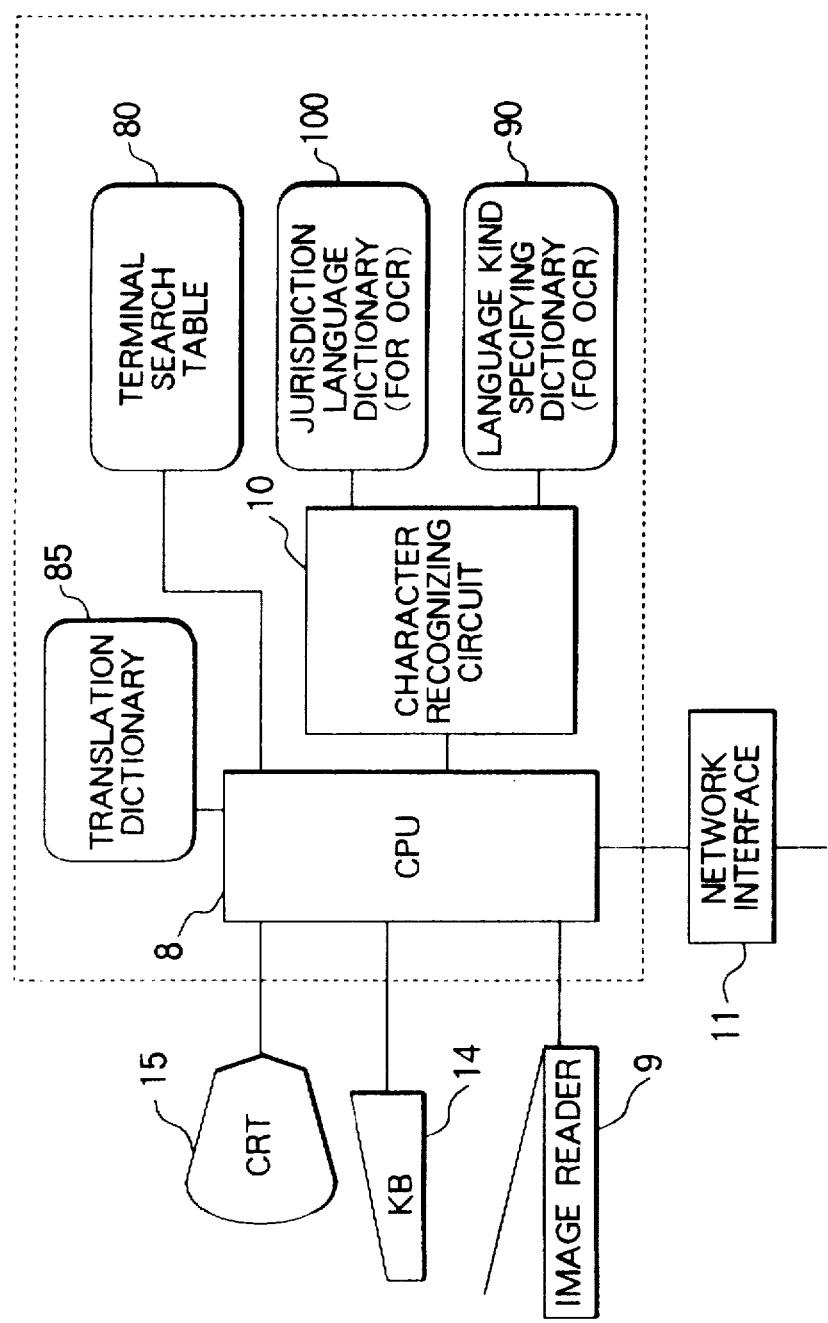
FIG. 8 is a diagram showing the construction of a terminal of a translation system according to a second embodiment of the present invention.
Figure 10:
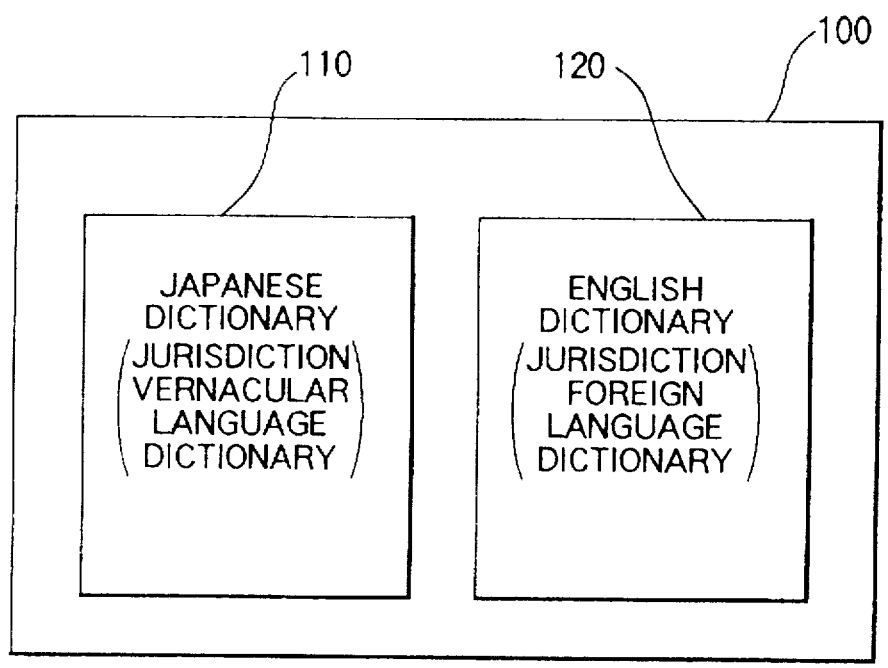
FIG. 10 shows the contents of a jurisdiction country language dictionary.
Figure 11:
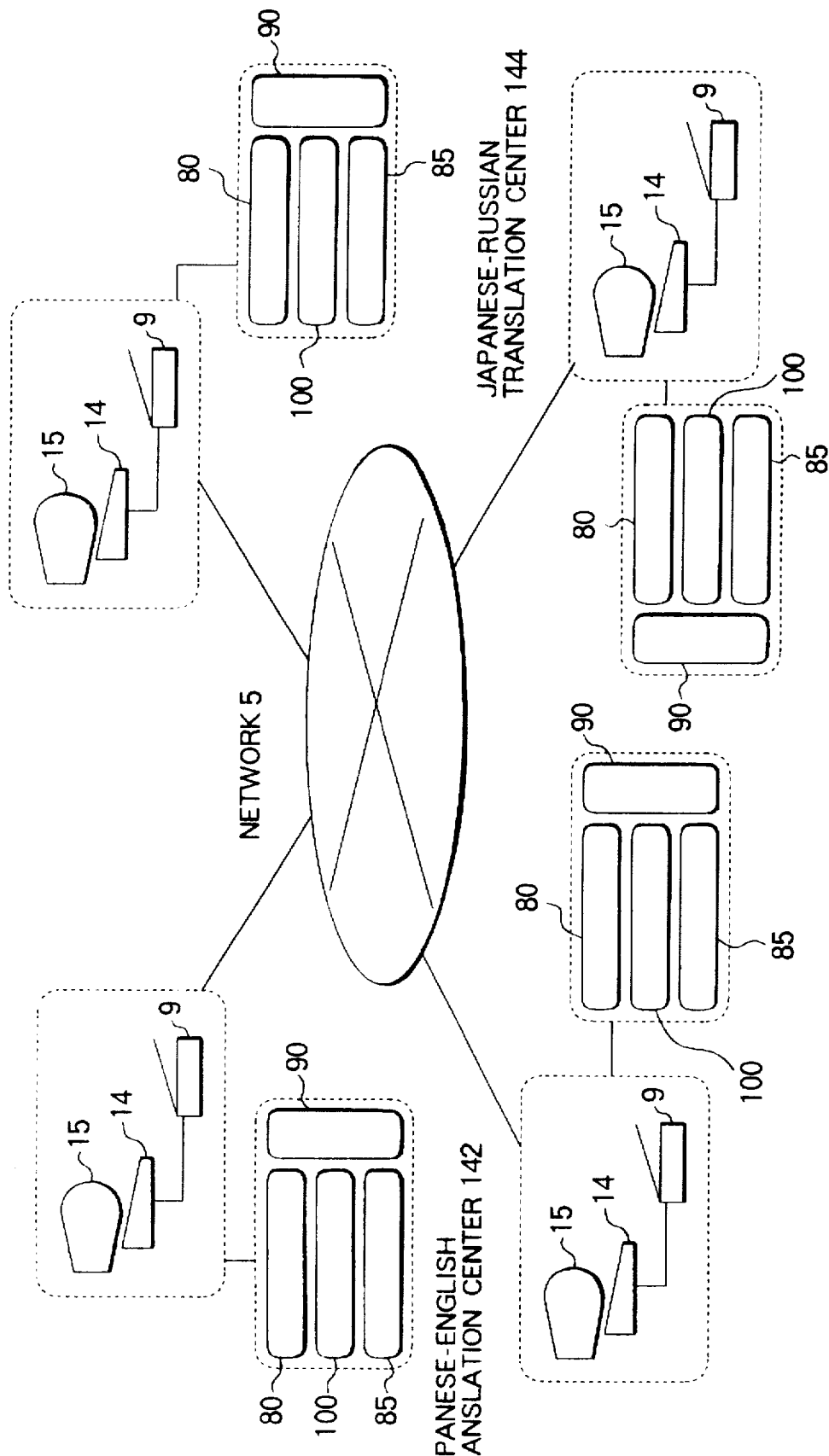
FIG. 11 is a diagram showing the overall construction of the translation system according to the second embodiment.

FIGS. 8 to 11 show a system according to a second embodiment of the present invention. FIG. 11 is a diagram showing an example of a system construction in the case where a Japanese-English translation center 141, a Japanese-French translation center 142, a Japanese-German translation center 143 and a Japanese-Russian translation center 144 are on-line connected through a network 5 so that an automatic translation between Japanese and English/French/German/Russian is performed at each of the centers 141, 142, 143 and 144. FIG. 8 is a diagram showing the construction of the translation center in the present embodiment. FIG. 9 is a diagram showing a language kind specifying dictionary 90 for identifying the language of inputted characters, and FIG. 10 is a diagram showing a jurisdiction language dictionary 100 for making the recognition and translation for a language over which a terminal of its own exercises jurisdiction.

As shown in detail by FIG. 8, each of the translation centers 141 to 144 includes an image reader 9 for optically reading a paper on which characters are written, a character recognizing circuit 10 for making a character recognition by picking up characters from image data read by the image reader 9 and referring to dictionaries which will be mentioned later on, a jurisdiction language dictionary 100 for OCR including OCR dictionaries of translation languages over which each translation center exercises jurisdiction, for example, a Japanese dictionary and an English dictionary in the case of Japanese-English translation, a language kind specifying dictionary 90 for specifying the kind of the language of characters read by the image reader 9, a terminal search table 80 for making a search for a jurisdictional translation center from the language kind specified by the language kind specifying dictionary 90, a translation dictionary 85 in which grammar and so on for translation between jurisdictional languages are stored, a network interface 11 on-line connected to other centers through the network 5 for transferring image data, text data and so on, a display section 15 for displaying the result of character recognition and so on, a keyboard 14 for making the correction of character recognition, the input of characters and so on by an operator, and a controller or CPU 8 for controlling the above components.

The language kind specifying table 90 is a dictionary for specifying the kind of a language in accordance with a character pattern and a word (or the combination of character patterns) peculiar to each language. For example, as shown in FIG. 9, in the case of a Japanese character pattern 91, since characters of the Japanese language have a special form different from those of the languages of other countries, the judgement as to whether or not the language kind is the Japanese language is made on the basis of character patterns including "て", "に", "を" and "は" (postpositions of the Japanese language) which have particularly a high frequency of occurrence. In the case of an English character pattern 92, since the alphabet is common to the languages of other countries, the judgement as to whether or not the language kind is the English language is made on the basis of word character patterns such as "The", "is", "That" and so on. In the case of a French character pattern 93, the judgement as to whether or not the language kind is the French language is made on the basis of character patterns peculiar to the French language and word character patterns such as "le", "ellese" and so on. In the case of a German character pattern 94, the judgement as to whether or not the language kind is the German language is made on the basis of character patterns peculiar to the German language and word character patterns such as "der", "dem" and so on.

The jurisdiction language dictionary 100 stores therein dictionaries for OCR of at least two kinds of languages which become the object of translation. In the Japanese-English translation center 141, the jurisdiction language dictionary 100 is composed of a Japanese dictionary 110 and an English dictionary 120, as shown in FIG. 10. In the Japanese-French translation center 142, the jurisdiction language dictionary 100 is composed of a Japanese dictionary and a French dictionary. In the Japanese-German translation center 143, the jurisdiction language dictionary 100 is composed of a Japanese dictionary and a German dictionary. In the Japanese-Russian translation center 144, the jurisdiction language dictionary 100 is composed of a Japanese dictionary and a Russian dictionary.

The terminal search table 80 stores therein a table for making a search for a jurisdictional translation center corresponding to the kind of the language of inputted characters by the language kind specifying dictionary 90, though not shown. For example, the table shows that the English dictionary is at the translation center 141, the French dictionary is at the translation center 142, the German dictionary is at the translation center 143, and the Russian dictionary is at the translation center 144. The translation dictionary 85 is a dictionary for storing therein data of translation between at least two kinds of languages over which the corresponding translation center exercises jurisdiction. At the Japanese-English translation center 141, translation data such as grammatical relation of the Japanese and English languages is stored.

The dictionary distributed system for language translation having the above construction operates as follows.

First, assume the case where the Japanese language is translated into the English language at the Japanese-English translation center 141. In the terminal shown in FIG. 8, the image reader 9 reads image data on a paper having the Japanese language written thereon and the character recognizing circuit 10 specifies the kind of the inputted language with reference made to the language kind specifying dictionary 90. This specifying includes comparing character patterns picked up from the read image with a plurality of character patterns 91 to 94 shown in FIG. 9 to examine the kind of the inputted language. In the case where the comparison with characters does not suffice to specify the language kind, comparison with words is made to specify the kind of the language of characters. In the present example, since the inputted character pattern is the Japanese language which has a special form different from the languages of other countries, that the inputted character pattern is the Japanese language is specified by only characters. Since there may be the case where the languages of other countries are included in the Japanese language, it is preferable that a language kind having more times of specifying is specified as the kind of the language of the inputted character pattern. In the Japanese-English translation center 141, since the inputted language character pattern is the Japanese language, as mentioned above, character patterns of the Japanese language are recognized referring to the Japanese dictionary 110 included in the jurisdiction language dictionary 100 provided in the center 141 itself and are converted into character codes. And, the controller 8 performs a Japanese-English translation in accordance with a known translation technique with reference made to the translation dictionary 85.

Next, explanation will be made of the case where a language inputted in the Japanese-English translation center 141 is French. In the terminal center shown in FIG. 8, the language of inputted characters from the image reader 9 is recognized or specified as the French language in accordance with the character pattern 93 of French characters and words shown in FIG. 9, and the controller 8 searches for a center having a French dictionary with reference made to the terminal search table 80 to know that a jurisdictional translation center is the Japanese-French translation center 142. The controller 8 transfers the inputted French character pattern (or image data) through the network interface 11 and the network 5 with the Japanese-French translation center 142 being designated. The French character pattern received by the Japanese-French translation center 142 are recognized referring to a French dictionary included in the jurisdiction language dictionary 100 provided in the center 142 itself and are converted into character codes. And, the controller 8 performs a French-Japanese translation in accordance with a known translation technique with reference made to the translation dictionary 85. The result of translation is transferred from the Japanese-French translation center 142 to Japanese-English translation center 141. Thereby, the Japanese-English translation center 141 can perform the French-Japanese translation with no French dictionary being provided in the terminal of its own.

Also, in the case where the recognition of character patterns becomes impossible in the course of the above-mentioned translation of the French language, for example, because of the inclusion of the German language in the French language, the translation can be continued in such a manner that the Japanese-French translation center 142 sends the character pattern difficult of recognition or the translation-impossible character pattern together with a flag indicative of the impossibility of translation back to the Japanese-English translation center 141 which in turn examines the language kind with reference made to the language kind specifying dictionary 90 and transfers the translation-impossible character pattern to the corresponding translation center 143. When the language kind cannot be specified, the effect of the impossibility of specifying and the translation-impossible character pattern can be displayed on the display section 15 so that a manual input or correction by an operator is made. It is needless to say that such transfer of the translation-impossible character pattern to another translation center in the course of translation of a language because of the inclusion of another language can also be applied to the above-mentioned case where the translation is made using mainly a dictionary in the translation center of itself.

Thus, the system for translation according to the present embodiment specifies the kind of the language of inputted characters with reference made to the language kind specifying dictionary 90 by use of the fact that the language of each country or the kind of a language can be specified in accordance with a specified character form(s) and/or a specified word(s), identifies a jurisdictional translation center with reference made to the terminal search table 80 in accordance with the specified language kind, and transfers character patterns directly to the jurisdictional translation center to recognize character codes. Therefore, the recognition can be performed at a high speed even in the case where a dictionary is distributed. Also, even in the case where characters of a certain language are inputted and characters of another language are included in the course of translation of the certain language, it is possible to continue the translation with reference made to a dictionary of another translation center.

In the system of the present embodiment having a plurality of translation centers connected by a network, the translation is performed referring to a translation dictionary. However, the present invention is not limited to this embodiment. For example, the present invention is also applicable to a system in which a plurality of languages are only OCR-recognized without being translated and are then displayed on a display section. A dictionary distributed system in this case can be realized by constructing each terminal by an image reader or scanner for inputting character patterns, a character recognizing circuit for optically recognizing the inputted character patterns to convert them into character codes, a detailed jurisdiction language dictionary for OCR for storing therein at least character patterns for the recognition of characters of a country over which that terminal itself exercises jurisdiction, a language kind specifying dictionary for OCR for storing therein character patterns of characters and words peculiar to each of a plurality of countries, a terminal search table for determining a terminal for characters recognized by the character recognizing circuit with reference made to the language kind specifying dictionary, a network interface for connecting that terminal to other terminals connected through a network, and a controller for determining, by use of the terminal search table, a terminal which exercises jurisdiction over the language of character patterns inputted from the image reader and for performing, in the case where the character patterns are determined as being characters over which that terminal itself exercises jurisdiction, a character recognition by the character recognizing circuit with reference made to the detailed jurisdiction language dictionary while transferring, in the case where the character patterns are determined as being characters over which another terminal exercises jurisdiction, the character patterns (or image data) to the other terminal through the network interface and inputting character codes as the result of character recognition from the other terminal, in which characters of a language corresponding to the character codes are displayed on a display section.

Though the above embodiment has been explained in conjunction with the example in which the jurisdiction vernacular language dictionary 110 and the jurisdiction foreign language dictionary 120 are stored in the jurisdiction language dictionary 100, the present invention is not limited to such an example. For example, many jurisdiction foreign countries can be provided in one jurisdiction language dictionary 100. A preferable construction in a real system is considered to be a construction in which a plurality of dictionaries having, for example, a high frequency of use are provided in common to each of translation centers and a special language dictionary is added as required by that translation center.

Figure 13:
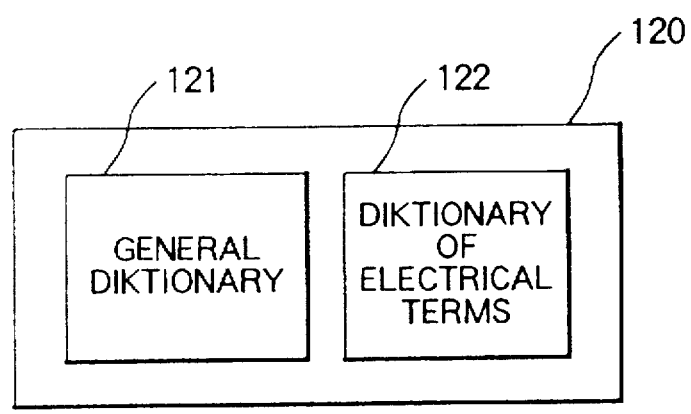
FIG. 13 shows the contents of a jurisdiction field dictionary.
Figure 14:
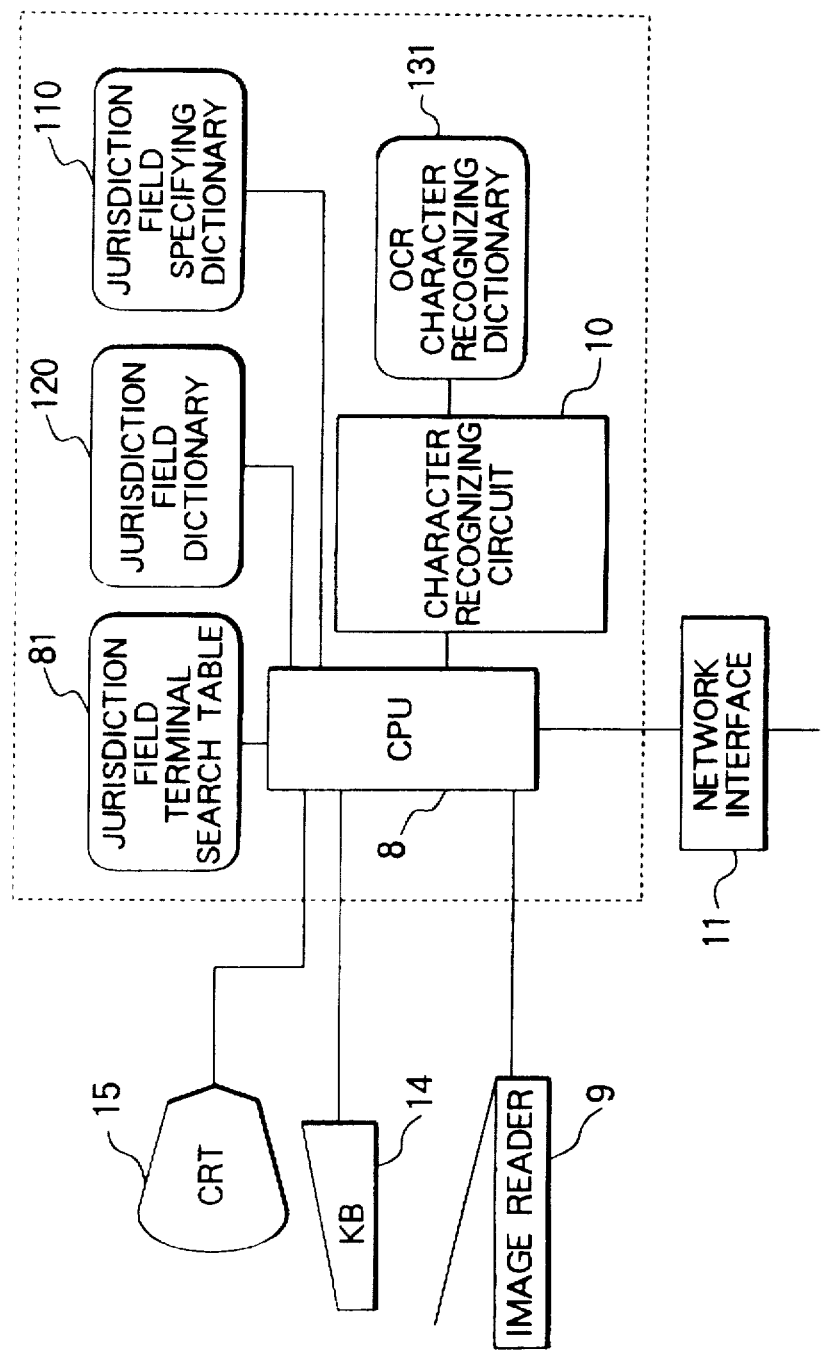
FIG. 14 is a diagram showing the construction of the term search system according to the third embodiment.
Figure 15:
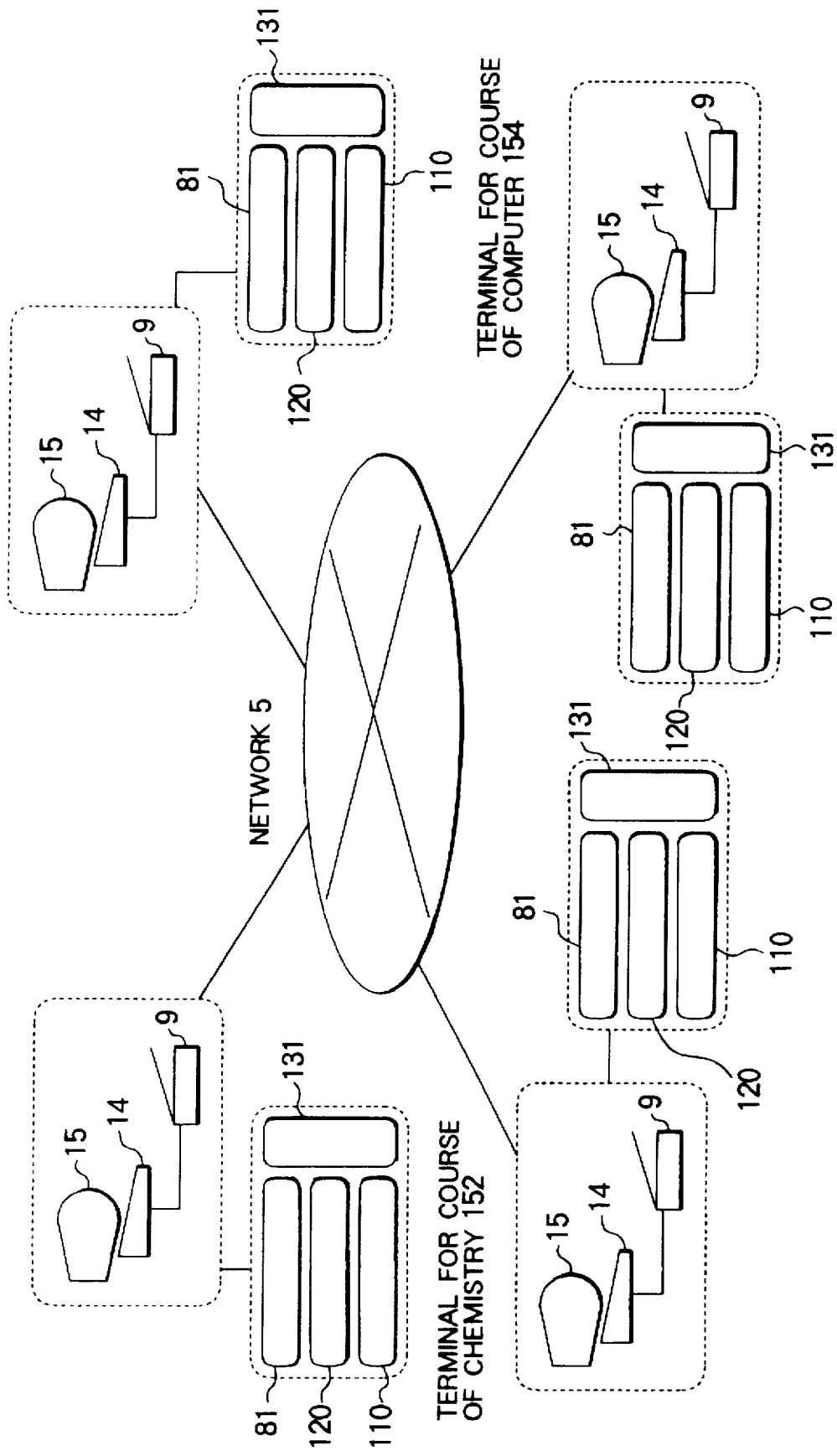
FIG. 15 is a diagram showing the overall construction of the term search system according to the third embodiment.

FIGS. 12 to 15 shows a third embodiment of the present invention in which a dictionary distributed system of the present invention is applied to terminals on-line connected to each other for making a search for the contents of technical terms or the like. The dictionary distributed system of the present embodiment is applied to, for example, a dictionary distributed system for making a search for the contents (or meanings) of technical terms in a university having many courses. FIG. 15 shows an example of a system construction in which technical term dictionaries are respectively distributed to a terminal 151 for the course of electrical engineering, a terminal 152 for the course of chemistry, a terminal 153 for the course of nuclear engineering and a terminal 154 for the course of computer in a university.

As shown in FIG. 14, each of the terminals in the system of the present embodiment includes an image reader 9 for optically reading characters on a paper, a character recognizing circuit 10 for recognizing characters by picking up characters from image data read by the image reader 9 and referring to an OCR character recognizing dictionary, a jurisdiction field dictionary 120 including a dictionary of terms of a technical field over which that terminal exercises jurisdiction (for example, a dictionary of electrical terms concerning electrical engineering or the like in the case of the course of electrical engineering) and a general dictionary, a jurisdiction field specifying dictionary 110 for specifying a technical field from words read by the image reader 9, a jurisdiction field terminal search table 81 for making a search for a jurisdictional terminal of inputted characters with reference made to the field specifying dictionary 110, a network interface 11 connected on line to other terminals through the network 5 for transferring image data, text data and so on, a display section 15 for displaying the result of character recognition and so on, a keyboard 14 for making the correction of character recognition, the input of characters and so on by an operator, and a controller or CPU 8 for controlling the above components.

Figure 12:
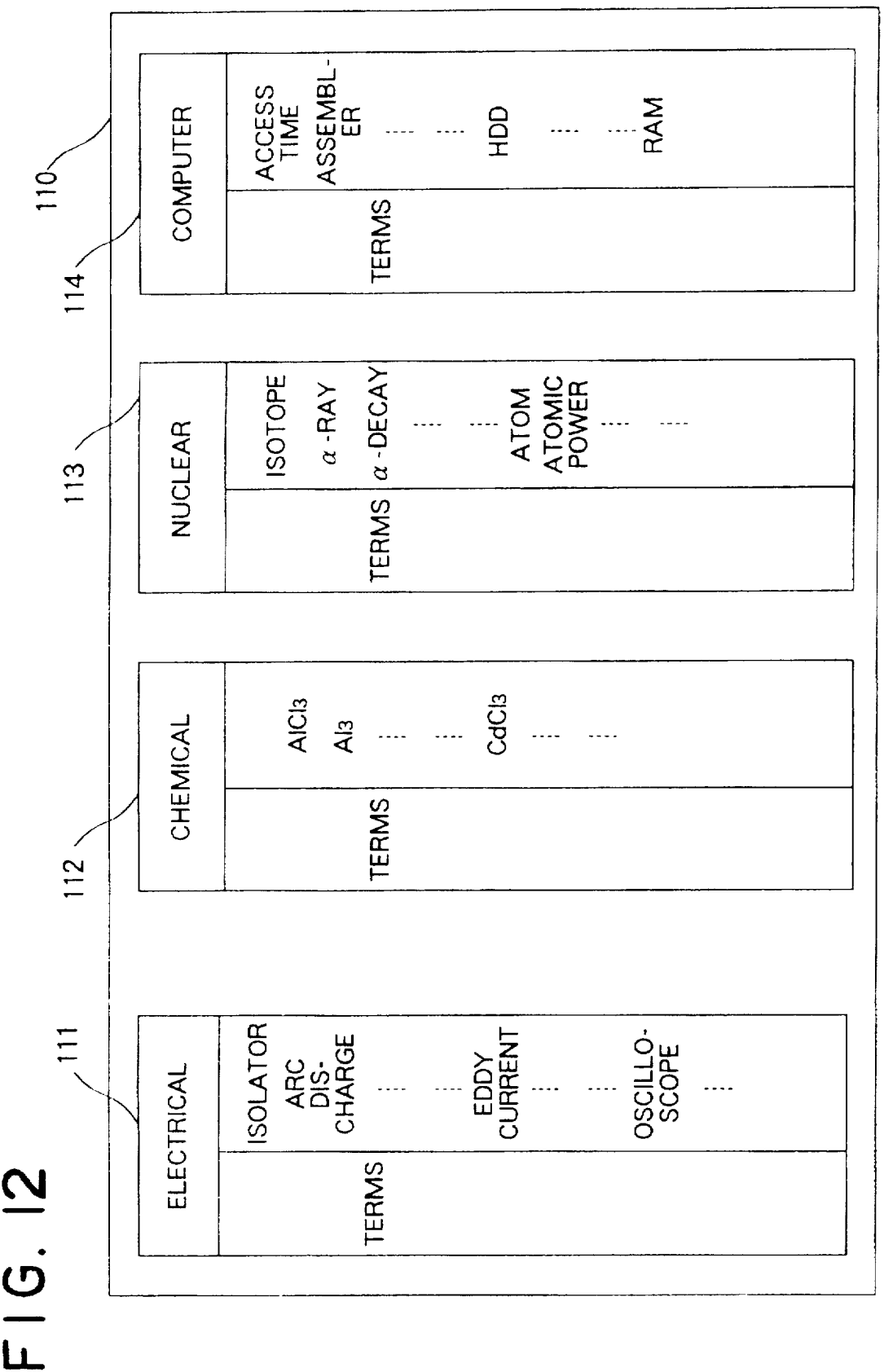
FIG. 12 shows the contents of a jurisdiction field specifying dictionary used in a term search system according to a third embodiment of the present invention.

The jurisdiction field specifying dictionary 110 is a dictionary for specifying a technical field in accordance with terms peculiar to that field. The dictionary 110 is set, for example, as a dictionary 111 of electrical terms such as "isolator" and "arc discharge" in the case of the field of electrical engineering, a dictionary 112 of chemical terms such as chemical symbols in the case of the filed of chemistry, a dictionary 113 of nuclear terms such as "isotope" in the case of the field of nuclear engineering, and a dictionary 114 of computer terms such as "assembler" in the case of the field of electrical computer, as shown in FIG. 12.

The jurisdiction field dictionary 120 stores therein a dictionary including the contents of technical terms over which the corresponding terminal exercises jurisdiction and a general language or vernacular dictionary. In the terminal 151 for the course of electrical engineering, the jurisdiction field dictionary 120 is composed of a general dictionary 121 and a dictionary 122 of electrical terms, as shown in FIG. 13. The jurisdiction field dictionary in each of the other terminals 152 to 154 is also composed of a general dictionary and a dictionary for a technical field over which that terminal exercises jurisdiction.

The jurisdiction field terminal search table 81 stores therein a table for designating a terminal corresponding to a technical field specified by the jurisdiction field specifying dictionary 110, for example, a table which shows that a dictionary of electrical terms is in the terminal 151, a dictionary of chemical terms is in the terminal 152, a dictionary for nuclear terms is in the terminal 153, and a dictionary of computer terms is in the terminal 154.

The dictionary distributed system for recognition of technical terms having the above construction reads, for example, at the terminal 151 for the course of electrical engineering, a report or the like on which technical terms are written and makes a search for the content of a term designated by an operator. For example, in the case where a search for the meaning of the term is to be made, the image reader 9 reads image data of the report and the character recognizing circuit 10 performs a character recognition so that an inputted document (or a plurality of terms) is displayed on the display section 15. When the operator designates, a term for which a search of the content is to be made, by use of the keyboard 9, the controller 8 refers to the jurisdiction field specifying dictionary 110 to determine a jurisdictional field of the term to be searched out on the basis of the term designated by the operator. If the term to be searched out is included in the jurisdiction field dictionary 120 of the terminal 151 itself, the controller 8 searches this dictionary 120 and displays the contents or the like of the searched-out term on the display section 15. If the term to be searched out is not included in the jurisdiction field dictionary 120 of the terminal 151 itself, the controller 8 searches for a jurisdictional terminal with reference made to the jurisdiction field terminal search table 81, transfers the term to be searched out directly to the jurisdictional terminal through the interface 11 and the network 5, receives the contents of the term from the jurisdictional terminal, and displays the received contents on the display section 15.

In the case where the specifying of a jurisdictional filed with reference made to the jurisdiction field specifying dictionary 110 is not possible, the controller 8 operates such that it searches for the jurisdictional fields of not only the designated term but also the other plural terms with reference made to the jurisdiction field specifying dictionary 110.

searches for a terminal of a field having the number of times of subjection to specifying with reference made to the jurisdiction field search table 81, and transfers the term to be searched out to that terminal to make a search for the contents of the term. In the case where a jurisdictional field cannot be specified in the above processing, a jurisdictional terminal may be specified by an operator's instruction to make a term search. Also, the input of a term to be searched out is not limited to the input of image data. For example, the term to be searched out may be inputted directly from the keyboard 14.

Thus, the dictionary distributed system for recognition of technical terms or the like according to the present embodiment refers to the jurisdiction field specifying dictionary to specify a field which exercises jurisdiction over a term to be searched out, determines a jurisdictional terminal in accordance with the specified field with reference made to the jurisdiction field terminal search table, and transfers the term to be searched out to the jurisdictional terminal directly. Therefore, a search for the contents of terms can be made at a high speed even in the case where dictionaries are distributed for respective fields.

Though the present embodiment has been explained in conjunction with the example in which a search is made for the contents of terms by fields, the present invention is not limited to such an example. There can be employed a construction in which symbol patterns of special symbols difficult of recognition by the OCR character recognizing dictionary 131, for example, special symbols such as benzene nucleus in chemical formula are additionally stored in the OCR character recognizing dictionary 131 of each terminal, as required by each field so that the terminal estimates the field of the special symbol by analysis of other plural terms in a manner similar to that mentioned above, transfers a symbol pattern of the special symbol to a terminal having a possibility of jurisdiction and receives a character code of the special symbol and a character pattern for display/print from another term so that they are displayed.

We claim:

1. A character information processing system comprising a plurality of terminals and network means for interconnecting said terminals to each other, in which each of said terminals includes:

means for processing character information, said character information to be processed by the processing means being different for each of said terminals;

means for inputting a group of character information;

means for picking up, from said group of character information, unit information which offers a key;

means for specifying, from the picked-up key character information, processing means in one of said terminals which is capable of processing said group of character information; and control means for sending all or a part of said group of character information to a terminal when the specified processing means is in said terminal so that all or a part of said group of character information is processed by said terminal, and for sending all or a part of said group of character information to another terminal through the network means when the specified processing means is in said another terminal so that all or a part of said group of character information is processed by said another terminal, said another terminal including means for returning a result of processing of all or a part of said group of character information through said network means from said another terminal to said terminal, wherein said key is included as at least a portion of said group of character information being processed.

2. A character information processing system according to claim 1, wherein said character information contains image information.

3. A character information processing system according to claim 2, wherein said inputting means includes an image reader.

4. A character information processing system according to claim 3, wherein the specified processing means recognizes characters from said image information.

5. A character information processing system according to claim 3, wherein the processing means in said terminal recognizes one language from said character information to generate corresponding character codes and the processing means in said another terminal recognizes another language from said character information to generate corresponding character codes.

6. A character information processing system according to claim 5, wherein each of said terminals further includes:

means for translating a language recognized by said processing means into another language, wherein said control means causes, when the specified processing means is in said terminal, the specified processing means to recognize a language of all or a part of said group of character information and causes said translating means to translate the recognized language into said another language, and wherein said control means sends, when the specified processing means is in said another terminal, all or a part of said group of character information to the specified processing means in said another terminal through said network means so that all or a part of said group of character information is recognized by the specified processing means of said another terminal, and causes said translating means of said another terminal to translate the recognized language into said another language, said another terminal including means for returning a result of the translation through said network means from the specified processing means of said another terminal.

7. A character information processing system according to claim 5, wherein said specifying means includes means for storing a relationship between said key character information and said specified processing means, and means for specifying the processing means from said picked-up key character information in accordance with said relationship.

8. A system for recognizing a plurality of kinds of languages, comprising a plurality of terminals and network means for interconnecting said terminals to each other, in which each of said terminals includes:

an image reader for inputting an image of a group of characters to be recognized;

a first memory for storing therein a first dictionary for recognizing predetermined key characters corresponding to said languages, contents of said first dictionary being same for each of said terminals;

a second memory for storing therein a second dictionary for recognizing one of said languages from said input character image, contents of said second dictionary being different for each of said terminals so that terminals have second dictionaries corresponding to different languages, respectively;

a third memory for storing therein a relationship between said key characters and said terminals;

a first recognizing circuit for recognizing a key character from said input character image with reference made to said first dictionary;

a second recognizing circuit for recognizing the one language corresponding to said second dictionary from said input image with reference made to the second dictionary;

a circuit for specifying one of said terminals from the recognized key character with reference made to said relationship of said third memory;

means for sending said input character image to the second recognizing circuit of said terminal when the specified terminal is said terminal so that said input character image is recognized by the second recognizing circuit of said terminal, and for transferring said input character image to the second recognizing circuit of another terminal through said network means, when the specified terminal is said another terminal, so that said input character image is recognized by the second recognizing circuit of said another terminal, said another terminal including means for returning a result of the recognition through said network means from said another terminal to said terminal, wherein said key character is included as a portion of said input character image being processed.

9. A system for recognizing an address which includes an upper-level area and a lower-level region, comprising a plurality of terminals and network means for interconnecting said terminals to each other, in which each of said terminals includes:

first memory means for storing therein a first dictionary for recognizing character patterns of said upper-level area, contents of said first dictionary being same for each of said terminals;

second memory means for storing therein a second dictionary or recognizing character patterns of said lower-level region, contents of said second dictionary being different for each of said terminals;

an input device for inputting an image of a character pattern of an address;

first character recognizing means for recognizing characters of said upper-level area from the input address character pattern with said first memory means;

means for specifying one of said terminals from the recognized upper-level area, said second dictionary of the specified terminal recognizing character patterns of lower-level regions covered by the recognized upper-level area;

second character recognizing means for recognizing characters of said lower-level area from the input address character pattern with reference made to said second dictionary stored in said second memory means; and means for sending a portion of said address character pattern corresponding to the lower-level region to the second character recognizing means of said terminal when the specified terminal is said terminal, so that characters of the lower-level region are recognized by the second character recognizing means of said terminal, and for sending the portion of said address character pattern corresponding to the lower-level region to the second character recognizing means of another terminal through said network means, when the specified terminal is said another terminal, so that characters of the lower-level region are recognized by the second character recognizing means of said another terminal, said another terminal including means for returning a result of said recognition through said network means from said another terminal.

10. A system according to claim 9, wherein said address is an address in Japan and said upper-level area includes an urban or rural prefecture, a great town of the urban or rural prefecture, a ward of the great town and a district of the urban or rural prefecture.

11. A system for recognizing a group of characters which includes an upper-level character group and a lower-level character group, comprising a plurality of terminals and network means for interconnecting said terminal to each other, in which each of said terminals includes:

first memory means for storing therein a first dictionary for recognizing character patterns of said upper-level character group, contents of said first dictionary being same for each of said terminals;

second memory means for storing therein a second dictionary for recognizing character patterns of said lower-level character group, contents of said second dictionary being different for each of said terminals;

an input device for inputting an image of said group of characters to generate image information;

first character recognizing means for recognizing characters of said upper-level character group from the image information of said group of characters with reference made to said first dictionary stored in said first memory means;

means for specifying one of said terminals from the recognized upper-level character group;

second character recognizing means for recognizing characters of said lower-level character group from the image information of said group of characters with reference made to said second dictionary stored in said second memory means;

means for sending all or a part of the image information of said group of characters to the second character recognizing means of said terminal, when the specified terminal is said terminal, so that characters of the lower-level character group are recognized by the second character recognizing means of said terminal, and for sending all or the part of the image information of said group of characters to the second character recognizing means of another terminal through said network means, when the specified terminal is said another terminal, so that characters of the lower-level character group are recognized by the second character recognizing means of said another terminal, said another terminal including means for returning a result of said recognition through said network means from said another terminal to said terminal.

12. A system for searching for a meaning of a designated term, comprising a plurality of terminals and network means for interconnecting said terminals to each other, in which each of said terminals includes:

means for inputting an image of a treatise in which a term as an object of search is used;

first memory means for storing therein key information including predetermined terms and symbols corresponding to fields, the key information stored in said first memory means being same for each of said terminals;

second memory means for storing therein a dictionary for a technical field, the dictionary stored in said second memory means being different for each of said terminals;

means for picking up said key information from a character pattern of the input treatise with reference made to content stored in said first memory means;

means for specifying a terminal on the basis of the picked-up key information;

means for making access to the dictionary of the second memory means of a terminal in which said access memory means is located when the specified terminal is the terminal in which said access means is located, and for making access to the dictionary of the second memory means of another terminal through said network means when the specified terminal is the other terminal;

means for designating said term as the object of search;

means for reading the meaning of the designated term from the accessed dictionary; and means for displaying the read meaning of the term.

13. A device for specifying a language used in character information inputted in an image form, comprising:

memory means for storing, for each kind of language to be specified, unit character information which offers a key to that language;

means for inputting an image of a group of character information; and means for specifying said language by comparing the inputted character information with said unit character information.

14. An information processing system including a plurality of terminals and network means for interconnecting said terminals to each other, said system comprising:

a first terminal for processing character information, said first terminal including:

means for processing character information, wherein each of said plurality of terminals, including said first terminal, processes different character information, means for inputting a group of character information, means for picking up, from the input character group, input character information which offers a key, means for specifying, from the picked-up key character information, processing means in one of said terminals which is capable of processing said group of character information, and control means for sending all or a part of said group of character information to said first terminal when the specified processing means is in said first terminal so that all or a part of said group of character information is processed by said first terminal, and for sending all or a part of said group of character information to a first another terminal through the network means when the specified processing means is in said first another terminal so that all or a part of said group of character information is processed by said first another terminal, said first another terminal including means for returning a result of processing all or a part of said group of character information through said network means from said first another terminal to said first terminal;

a second terminal for recognizing an address, including an upper-level area and a lower-level region, said second terminal comprising:

first memory means for storing therein a first dictionary for recognizing character patterns of said upper-level area, contents of said first dictionary being same for each of said terminals, second memory means for storing therein a second dictionary for recognizing character patterns of said lower-level region, contents of said second dictionary being different for each of said terminals, an input device for inputting an image of a character pattern of an address, first character recognizing means for recognizing characters of said upper-level area from the input address character pattern with reference to said first dictionary stored in said first memory means, means for specifying one of said terminals from the recognized upper-level, said second dictionary of said second terminal recognizing character patterns of lower-level regions covered by the recognized upper-level area, second character recognizing means for recognizing characters of said lower-level area from the input character pattern with reference to said second dictionary stored in said second memory means, and means for sending a portion of said address character pattern corresponding to the lower-level region to the second character recognizing means of said second terminal when the specified terminal is said second terminal so that characters of the lower-level region are recognized by the second character recognizing means of said second terminal, and for sending the portion of said address character pattern corresponding to the lower-level region to the second character recognizing means of a second another terminal through said network means when the specified terminal is said second another terminal so that characters of the lower-level region are recognized by the second character recognizing means of said second another terminal, said second another terminal including means for returning a result of recognition through said network means from said second another terminal; and a third terminal for searching a meaning of a designated term, said third terminal comprising:

means for inputting an image of a treatise in which a term as an object of search is used, third memory means for storing therein key information inclusive of at least terms and symbols which are beforehand determined corresponding to fields, the key information stored in said third memory means being same for each of said terminals, fourth memory means for storing therein a dictionary for a technical field, wherein technical field dictionaries stored in all of said terminals, including the dictionary stored in said fourth memory means of said third terminal, are different for each of said terminals, means for picking up said key information from a character pattern of the input treatise with reference made to content stored in said third memory means, means for specifying a terminal on the basis of the picked-up key information, means for making access to the dictionary of the fourth memory means of said third terminal when the specified terminal is said third terminal, and for making access to the dictionary of the second memory means of a third another terminal through said network means when the specified terminal is said third another terminal, means for designating said term as the object of search, means for reading the meaning of the designated term from the accessed dictionary, and means for displaying the read meaning of the term.

* * * * *